United States Patent [19]
Kasahara

[11] Patent Number: 4,759,005
[45] Date of Patent: Jul. 19, 1988

[54] OPTICAL HEAD APPARATUS FOR RECORDING AND REPRODUCING DATA ON A REORDING MEDIUM

[75] Inventor: Akihiro Kasahara, Chigasaki, Japan

[73] Assignee: Kabushiki Kaisha Toshiba, Kawasaki, Japan

[21] Appl. No.: 775,383

[22] Filed: Sep. 12, 1985

[30] Foreign Application Priority Data

Oct. 2, 1984 [JP] Japan .................................. 59-205552
Mar. 26, 1985 [JP] Japan .................................. 60-59520

[51] Int. Cl.$^4$ ................................................ G11B 7/09
[52] U.S. Cl. ........................................ 369/44; 369/45; 350/255
[58] Field of Search ..................... 369/44, 45; 350/252, 350/255, 247

[56] References Cited

U.S. PATENT DOCUMENTS 4,321,701  3/1982  Arquie ................................... 369/45
4,408,313  10/1983 Musha .................................... 369/45
4,462,096  7/1984  Kusaka ................................... 369/45
4,467,463  8/1984  Yano ..................................... 369/45
4,507,764  3/1985  Musha .................................... 369/45
4,566,089  1/1986  Kime ..................................... 369/45
4,646,283  2/1987  Ito ...................................... 369/44

FOREIGN PATENT DOCUMENTS 20092997  11/1983  European Pat. Off. .
0112595   7/1984   European Pat. Off. ............ 369/111
2556121   6/1985   France .
58-12145  1/1983   Japan .
58-62836  4/1983   Japan ................................... 369/45
60-76039  4/1985   Japan ................................... 369/45

Primary Examiner—Alan Faber
Attorney, Agent, or Firm—Oblon, Fisher, Spivak, McClelland & Maier

[57] ABSTRACT

An optical head apparatus for recording and reproducing data by forming optical dots on a recording surface of a recording medium, comprising a base which is movable in a prescribed direction, a movable body movably provided in relation to the base, a lens which is attached to the movable body, a pair of magnets fixed to the side surfaces of the movable body, and a pair of position adjustment coils, which are attached to the base facing the pair of magnets, for operating together with the magnets to move the movable body in a prescribed direction, the coils being wound such that surfaces formed by loops of the coils are vertical to direction of magnetization of the magnets.

8 Claims, 11 Drawing Sheets

OPTICAL HEAD APPARATUS FOR RECORDING AND REPRODUCING DATA ON A REORDING MEDIUM

BACKGROUND OF THE INVENTION

This invention relates to an optical head for recording data on and reproducing data from an optical recording medium.

Recently, together with improvements in digital signal processing technology, there have been various developments in digital recording systems. These digital systems have been used to ameliorate the problems occurring in the prior art analog system of recording, to reduce the noise and distortion in the recording signal data and to increase the recording density. For example, when using a disk coated with a metal thin film, the various data is recorded by forming pits in the disk, which correspond to the digitalized data. The recorded data is reproduced by detecting the presence or absence of the pits.

When pits are formed in this kind of disk (optical disk), the diameter of the pits should be formed less than about 1.0 μm across and the track pitch should be 1.0 to 2.0 μm according to increases in density. Light is used to form the pits recording the data and to detect the presence and absence of the pits for reproduction. The optical head used for recording and reproducing should have excellent tracking and focusing control functions.

In practice, when a 5 V power source is used, for example, the optical head must have a drive sensitivity such that the optical head acceleration of about 36 m/s$^2$ in both tracking and focusing directions can be obtained with a low power consumption of ⅓ watt. In order to produce this kind of function, ordinary variable coil or variable magnet systems have been considered for the optical head drive system. There is a tendency to use the variable coil system based on prior art high acceleration one-dimensional drive system, such as the voice coils of speakers, in recent years.

With the variable coil systems, however, it is necessary to attach a lead wire to the coil for supplying power from the stationary section, resulting in deterioration of the optical head's vibration characteristics under the influence of the lead wire and making precise positioning of the head impossible. Furthermore, the terminal board required for attaching the lead wire increases the weight of the optical head, reducing the drive sensitivity.

With the variable magnet system, on the other hand, none of the above problems exist, the apparatus has superlative vibration characteristics and the assembly is simple. An example which illustrates these characteristics is the variable magnet optical head shown in Japanese Patent Laid-Open Publication 58-12145. With this apparatus, however, a force acting on a portion of the focus coil facing the magnet and force acting on the other portions of the focusing coil act in opposite directions each other, resulting in mutual cancellation of the magnetic force. Consequently, the reaction force for the magnet is extremely weak and the drive sensitivity of the optical head is insufficient. Thus, although the variable magnet system is known for its superlative vibration characteristics, it lacks practicability.

SUMMARY OF THE INVENTION

The object of the invention is to provide a variable magnet type optical head apparatus, which is small, has low power consumption and high drive sensitivity, and can control the focusing and the tracking with great precision and good vibration characteristics.

In order to achieve the above object, the optical head apparatus of this invention comprises:
a base, which is movable in a prescribed direction;
a movable body, which is movable in relation to the base;
a lens, which is attached to the movable body;
a pair of magnets fixed to the side surfaces of the movable body; and
a pair of positioning coils, attached to the base facing the pair of magnets, for operating together with the magnets to move the movable body in a prescribed direction, the coils being wound such that surfaces formed by loops of the coils are vertical to direction of magnetization of the magnets.

BRIEF DESCRIPTION OF THE DRAWINGS

Other objects and advantages will be apparent from the following description taken in conjunction with the accompanying drawings in which.

DETAILED DESCRIPTION OF THE PREFERRED EMBODIMENTS

The following is a description, in conjunction with FIGS. 1-6, of the principles of the optical head apparatus of this invention.

Figure 1:
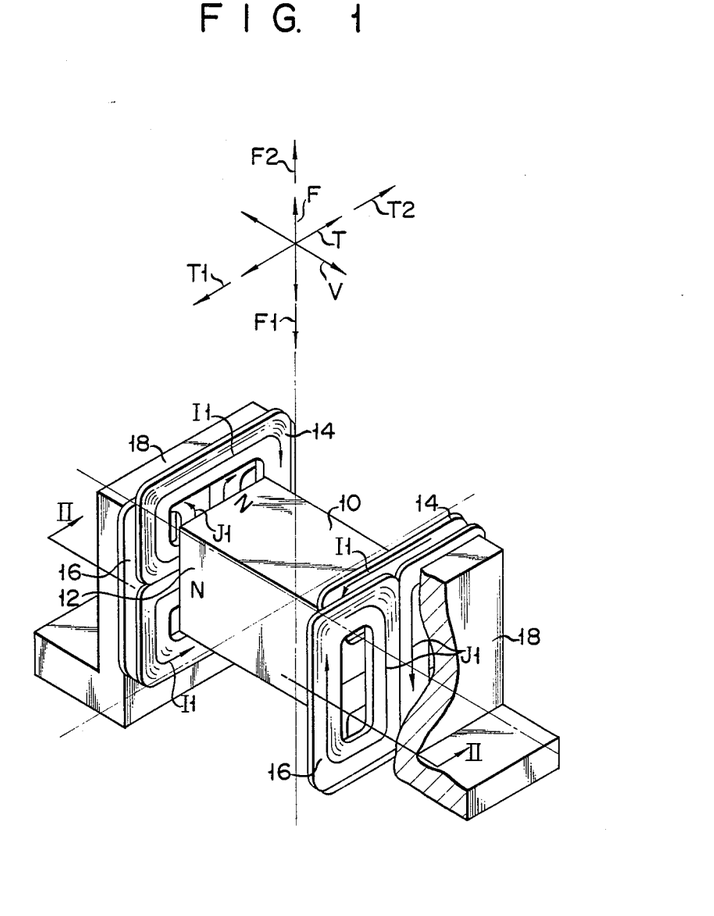
FIG. 1 is a perspective with a partially cut away part of an optical head for illustrating the principles of this invention.
Figure 2:
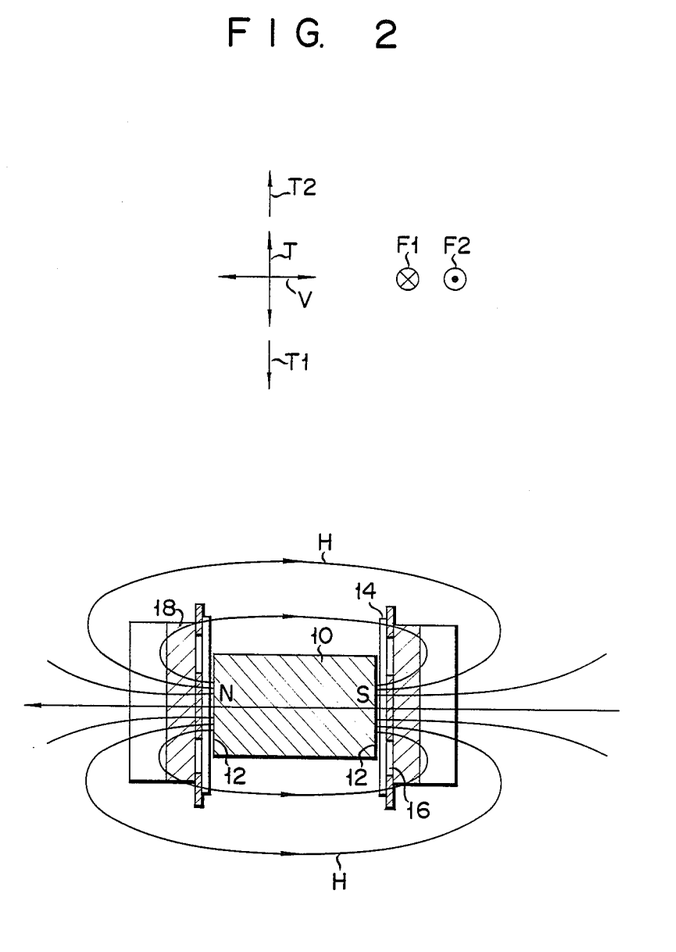
FIG. 2 is a cross section along the line II—II of the optical head shown in FIG. 1.
Figure 3:
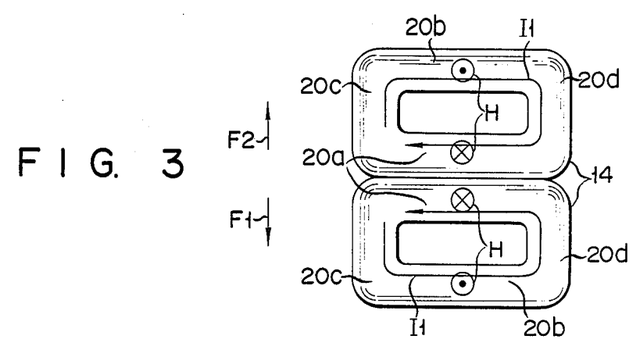
FIGS. 3–6 show the operating principle of the focusing and tracking coils.
Figure 4:
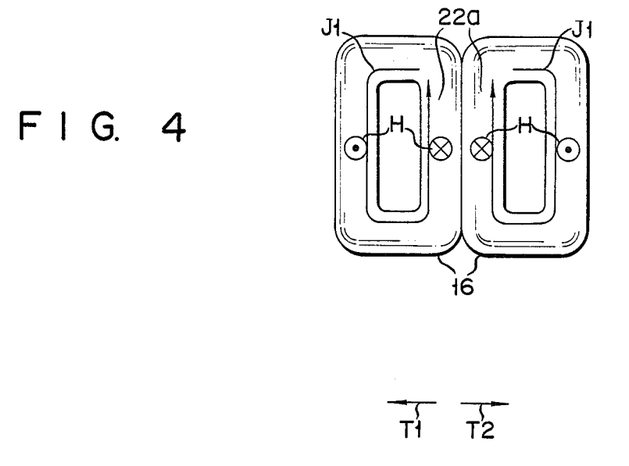

As shown in FIG. 1, movable magnet 10 is supported by the support structure such that it can move in the focusing and tracking directions F and T, which are 90° to each other. Movable magnet 10 is magnetized in a direction V perpendicular to both the F and T directions and the ends 12 have an N and S polarity, respectively. First coil 14 and second coil 16 are fastened to fixed stud 18 with set gap between the coils 14, 16 and ends 12 in the direction of magnetization of movable magnet 10, respectively. First and second coils 14, 16 are formed into a substantially rectangular shape with a flat vertical surface in the direction of magnetization of movable magnet 10 by winding a pair of coil elements 14a, 14b and 16a, 16b. That is, surfaces formed by loops of the coils are vertical to direction of magnetization of the magnets 10. Side portions 20a of coil elements 14a, 14b of first coil 14, which are in contact with each other, are arranged opposing ends 12 of movable magnet 10, respectively and parallel to direction T. Side portions 22a of coil elements 16a, 16b of second coil 16, which are in contact with each other, are arranged opposing ends 12 of movable magnet 10 and parallel to direction F.

With this kind of structure, when a current flows in first coil 14 in direction $I_1$ as is shown in FIGS. 1-4, the lines of magnetic force H and current direction $I_1$ are distributed as shown. Consequently, there is a force acting in direction $F_1$ of sides 20a, 20b of first coil 14 based on Fleming's left hand rule and the reaction force to this is generated in direction $F_2$ moving movable magnet 10. In this way, the force is exerted in the same direction for side 20b of first coil 14, which is not facing end 12 of movable magnet 10, as for side 20a, which is facing end 12. This results in a mutual increase in force, which means that the force acting on movable magnet 10 as the reaction for the force acting on the coil is stronger than the force received by side 20a of first coil 14 facing the magnet. Accordingly, high drive sensitivity is obtained. The force received by the other two sides 20c, 20d of first coil 14 is in the T direction and in mutually opposite directions so that they cancel each other out and do not weaken the force in the F direction.

When current flows in direction $J_1$ in the second coil 16, on the other hand, a strong force is generated for moving movable magnet 10 in the direction $T_2$ based on the same magnetic action.

Figure 5:
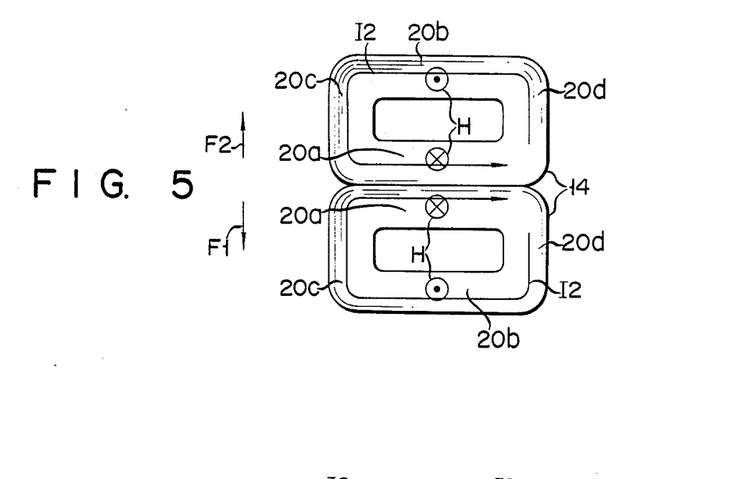
Figure 6:
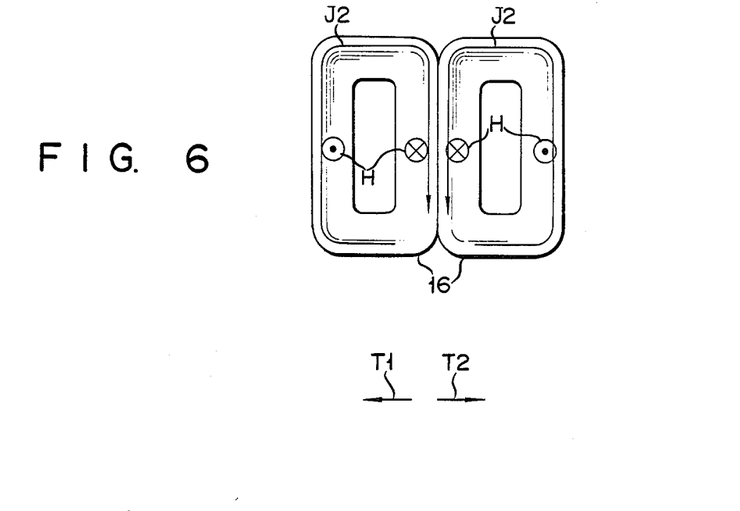

As shown in FIGS. 5 and 6, when current flows in opposite directions $I_2$ and $J_2$ in first and second coils 14, 16, respectively, a force is generated which moves movable magnet 10 in directions $F_1$, $T_1$.

Figure 7:
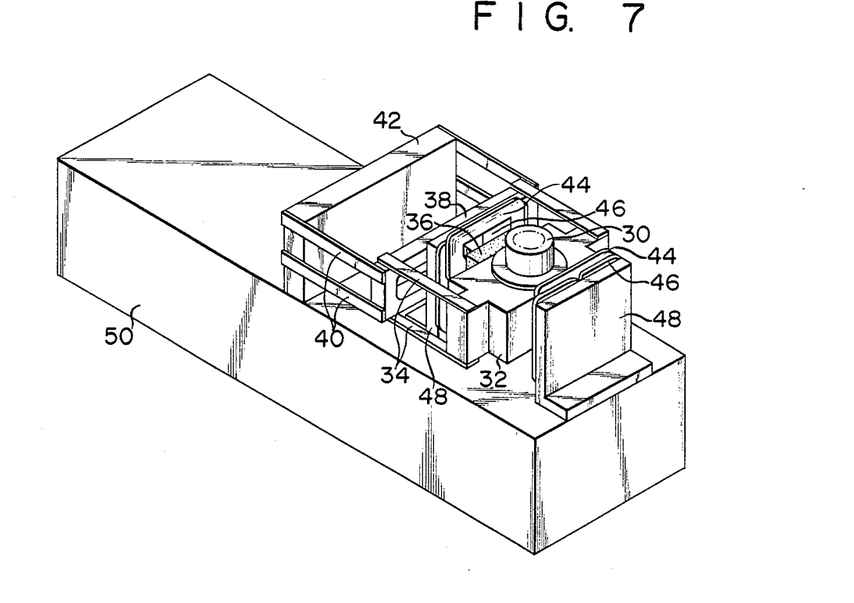
FIG. 7 is a perspective of the optical head according to the first embodiment of the invention.

The following is a description, in conjunction with FIG. 7, of an actual embodiment of this invention. Objective lens 30 for converging the light into a spot on the disk surface is mounted on movable body 32, which has a rigid construction. The ends of one side of focusing springs 34, which are formed of metal parallel leaf springs positioned perpendicular to the optical axis, for example, are fastened to movable body 32 to move the entire structure parallel to the focusing direction without any distortion. A pair of permanent magnets 36 are coaxially mounted on the two ends of movable body 32 to thereby form a single unit with objective lens 30. The direction of magnetization of permanent magnets 36 is perpendicular to the optical axis of objective lens 30 and perpendicular to the tracking direction. The other ends of focusing springs 34 are mounted on the parallel surfaces, i.e., the upper and lower surfaces, of intermediate support 38, which is made of a material that is both rigid and light in weight. This then constitutes the support mechanism in the focusing direction.

The ends of one side of tracking springs 40, which comprise two parallel leaf springs, are mounted to the mutually parallel surfaces, which are at 90° to the upper and lower surfaces of intermediate support 38, i.e., the front and rear surfaces. The other ends of tracking springs 40 are mounted to fixed support 42. This then constitutes the tracking support mechanism in the tracking direction.

Focusing spring 34 and tracking spring 40 have their shapes and positions not to intercept an optical path within movable range of objective lens 30.

With this arrangement, focusing springs 34 and tracking springs 40 always maintain a parallelogram relationship when changing shapes, so the optical axis of objective lens 30 itself is always perpendicular to the disk regardless of the direction of movement.

Focusing and tracking coils 44 and 46, which are wound into a substantially rectangular shape that forms a flat vertical surface in the direction of magnetization of permanent magnets 36, are fastened to coil stud 48 such that a constant gap is formed between the coils and the end of permanent magnet 36. One lengthwise side of focusing coil 44, which faces the end of permanent magnet 36, is positioned perpendicular to the optical axis of objective lens 30, and one lengthwise side of tracking coil 46, which faces the end of permanent magnet 36, is positioned parallel to the optical axis of objective lens 30. The part area of the focusing and tracking coils 44, 46 facing the magnets 36 is not more than half of the total area of both the coils and openings surrounded by the coils.

Coil stud 48 and support member 42 connected to the leaf springs are mounted on base 50 to form a single unit.

With this kind of construction, objective lens 30 faces the surface of the disk and a light spot for reading out data is projected on the tracks through objective lens 30. Then, the reflected light passes through objective lens 30 and into the detection means (not shown) located under base 50 to read out the data recorded on the optical disk.

At this time, using the reflected light, the deviations in both the focusing and tracking directions are detected, and electrical signals, which correspond to these deviations, are output. A correction current is respectively send to tracking coil 46 and focusing coil 44 in response to these electrical signals, and, based on the principles illustrated in FIGS. 1 to 6, permanent magnet 36 is driven in the focusing and tracking directions. In this way, tracking springs 40 are displaced by the drive toward the tracking direction of permanent magnet 36 while being kept parallel, and focusing springs 34 are displaced by the drive in the focusing direction of permanent magnet 36 while being kept parallel. Consequently, objective lens 30 moves to the optimal position while always maintaining a perpendicular relationship between the disk and the optical axis.

Figure 8:
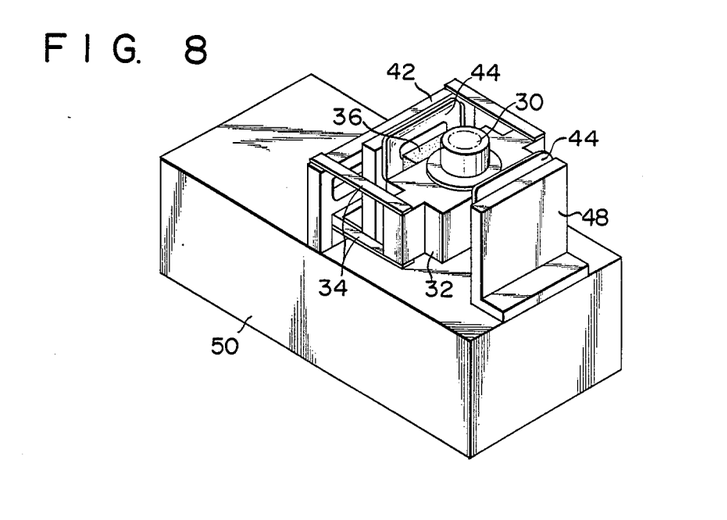
FIG. 8 is a perspective of the optical head according to the second embodiment of the invention.

The following is a description, in conjunction with FIG. 8, of the second embodiment of the optical head apparatus according to the invention. In this embodiment, the drive system of the invention, namely, focusing coil 44 and focusing spring 34, is used only for the focusing drive. For the drive in the tracking direction, another driving system may be used. The rest of the structure is the same as that in the first embodiment so the same reference numerals have been used for the same parts, and a description of which has been omitted.

The following is a description, in conjunction with FIGS. 9 to 17, of the third embodiment of the optical head apparatus of the invention. Base 100 is formed of non-magnetic metals, e.g., aluminum or engineering plastics having high rigidity such as polyphenylen sulfide (PPS), etc. Base 100 has a hole 102 and coil plates 104a, 104b which project upward, are symmetrically positioned with hole 102 in the center. Stopper pin 106 is provided projecting upward between hole 102 and coil plate 104b.

Figure 9:
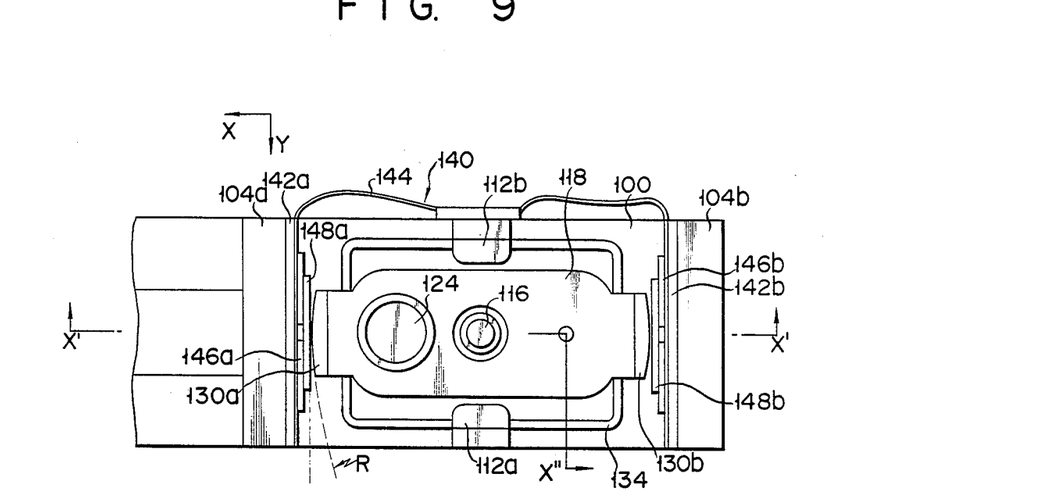
FIG. 9 is a plan view of the optical head according to the third embodiment of the invention.

Coil unit positioning holes 108 are provided in coil plates 104a, 104b. A hole 110 for allowing a laser beam generated from a laser diode (not shown) to pass is provided in coil plate 104a. Damper member mounts 112a, 112b are provided on base 100 projecting upward and symmetrically positioned around hole 102 in a direction intersecting the line between coil plates 104a, 104b. Mirror 114 for changing the direction of the laser beam from the X axis to the Z axis is fastened to base 100 between coil plates 104a and hole 102.

Support shaft 116 (hereinafter simply referred to as a shaft) is inserted into hole 102 and fastened with adhesive, screws or by press fitting to be implanted in the base 100. Movable member 118, which is formed of dimensionally stable non-magnetic engineering plastic having high rigidity such as polyphenylen sulfide, is fitted to shaft 116.

Movable member 118 is provided symmetrically with shaft 116 and has a bushing 120 which is formed of a sliding bearing fitted over shaft 116. Based on the fitting between bushing 120 and shaft 116, movable member 118 rotates and slides along the shaft 116. Movable member 118 is arranged such that its lengthwise direction is in a straight line between coil plates 104a, 104b and a hole 122 is provided on the end of the coil plate 104a side of movable member 118. Objective lens 124 is fastened to movable body 118 in hole 120 to make the optical axis parallel to shaft 116.

In a position symmetrical with the attachment position of objective lens 124 in relation to shaft 116, a balance hole 126, which does not extend all the way through, is provided on the other lengthwise end of movable body 118 for arranging the center of gravity of movable body 118, which includes a magnet (to be described later), along the axis of shaft 116. The crown of stopper pin 106, which prevents objective lens 124 from moving too much in the tracking direction Y and focusing direction Z, is inserted without touching into balance hole 126 with enough of a gap for objective lens 124 to move.

Figure 10:
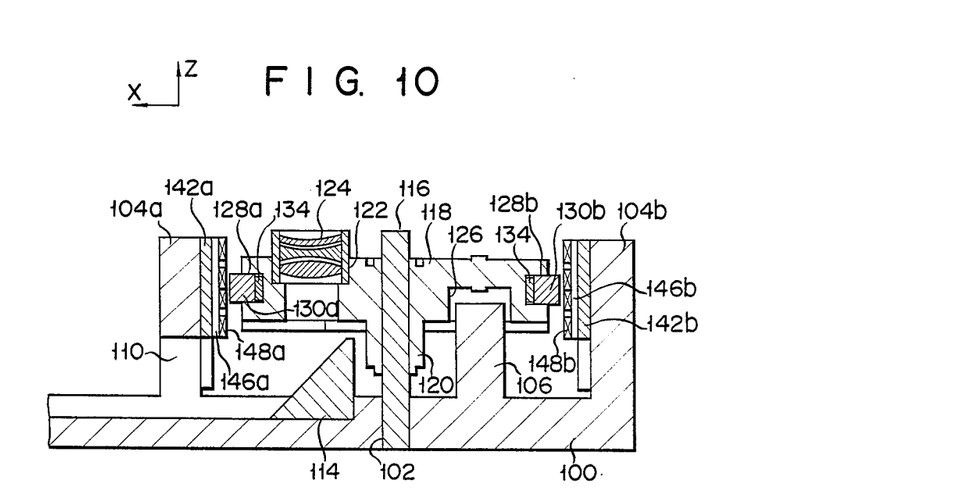
FIG. 10 is a cross section along the line X'—X' of FIG. 9.

Magnet positioning grooves 128a, 128b are provided in the side surfaces of the two ends of movable body 118 facing coil plates 104a, 104b. Magnets 130a, 130b which have a substantially rectangular parallelepiped shape, are fastened to movable body 118 using these grooves 128a, 128b, and arranged with the lengthwise direction of the surfaces facing coil plates 104a, 104b in the tracking direction corresponding to the Y axis in FIG. 9, as is shown in FIGS. 9 and 10. The surfaces of magnets 130a, 130b facing coil plates 104a, 104b are convex and the direction of magnetization is perpendicular to the surfaces of coil plates 104a, 104b facing magnets 130a, 130b.

Figure 15:
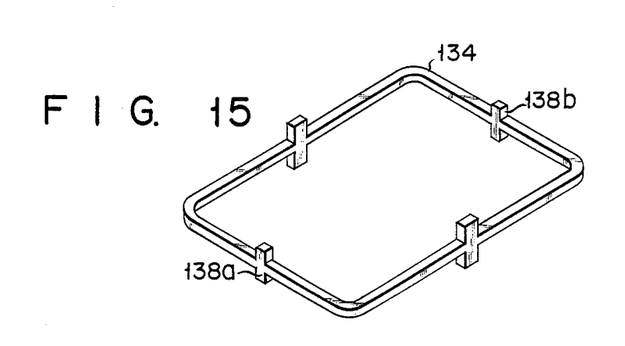
FIG. 15 is a perspective of the damper member incorporated in the optical head apparatus of FIG. 9.

Damper groove 132a, 132b are provided in the bottom surface of magnet positioning grooves 128a, 128b in which magnets 130a, 130b are fastened. The damper members 134, which are formed of rubber such as silicone, engage with damper grooves 132a, 132b and magnets 130a, 130b are fastened over them. Sections 136a, 136b, which have parts of different widths, are provided in damper grooves 132a, 132b and sections 138a, 138b, which have widths that vary similarly to sections 136a, 136b, are provided in corresponding positions of damper member 134. The relative position of movable member 118 is determined by damper member 134 and sections 136a, 136b of damper grooves 132a, 132b. Damper member 134 engages with damper mounts 112a, 112b to be fastened to base 100.

Coil unit 140 is fastened to the surfaces of coil plates 104a, 104b facing movable body 118.

Figure 16:
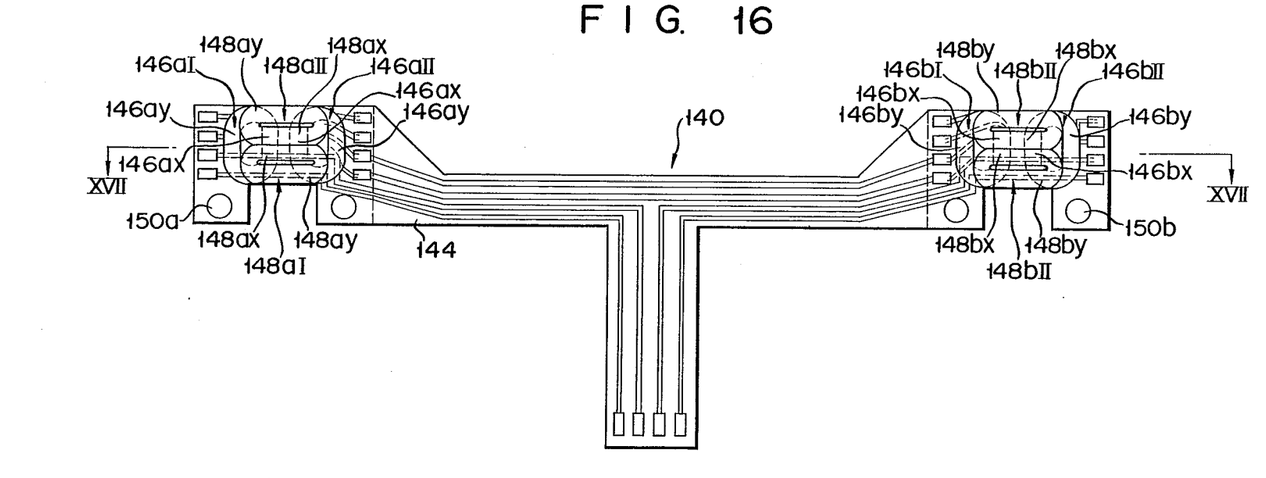
FIG. 16 is a plan view of coil unit incorporated in the optical head apparatus of FIG. 9.
Figure 17:
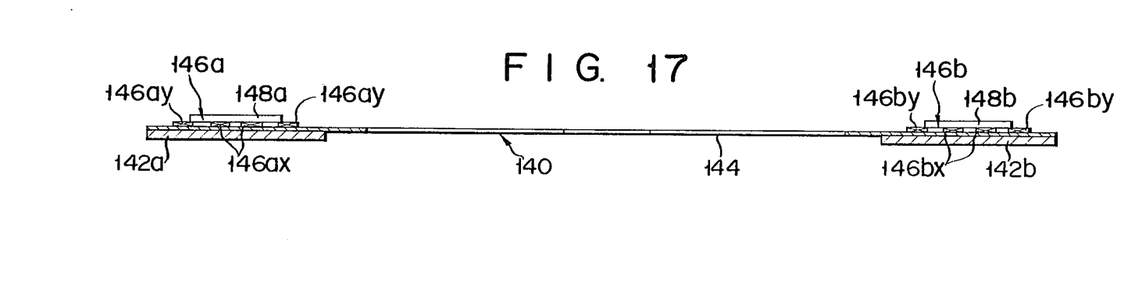
FIG. 17 is a cross section along the line XVII—XVII of FIG. 16.

As shown in FIGS. 16 and 17, coil unit 140 comprises reinforcing plates 142a, 142b which are made of a material such as glass fiber reinforced plastic (GFRP), flexible printed circuit board 144, which is made of a resin material such as a polyimide and is fastened to reinforcing plates 142a, 142b, tracking position adjustment coils 146a, 146b, which are oval shaped and fastened to flexible printed circuit board 144 such that their lengthwise directions are in the direction of the optical axis of objective lens 124, and focusing position adjustment coils 148a, 148b, which are oval shaped and fastened to tracking position adjustment coils 146a, 146b such that their lengthwise directions are in a direction intersecting the optical axis of objective lens 124, which is direction Y.

In FIGS. 16 and 17, tracking position adjustment coils 146a, 146b and focusing position adjustment coils 148a, 148b are arranged such that the long sides 146ax, 146bx, 148ax, 148bx face magnets 130a and 130b, respectively. The other long sides 146ay, 146by, 148ay, 148by do not face magnets 130a and 130b. Tracking position adjustment coils 146a, 146b and focusing position adjustment coils 148a, 148b are comprised of two serially connected coils 146aI, 146aII and 148bI, 148bII, respectively. All these coils are constructed using conductive wiring having rectangular cross sections. The long side of these cross sections of conductive wiring is in the same direction as the direction of magnetization of magnets 130a, 130b, which are in the X axis.

Coil positioning holes 150a, 150b are provided in reinforcing plates 142a, 142b. The position of coil unit 140 on coil plates 104a, 104b is determined by coil positioning holes 150a, 150b and coil unit positioning hole 108, which is provided in coil plates 104a, 104b.

Figure 11:
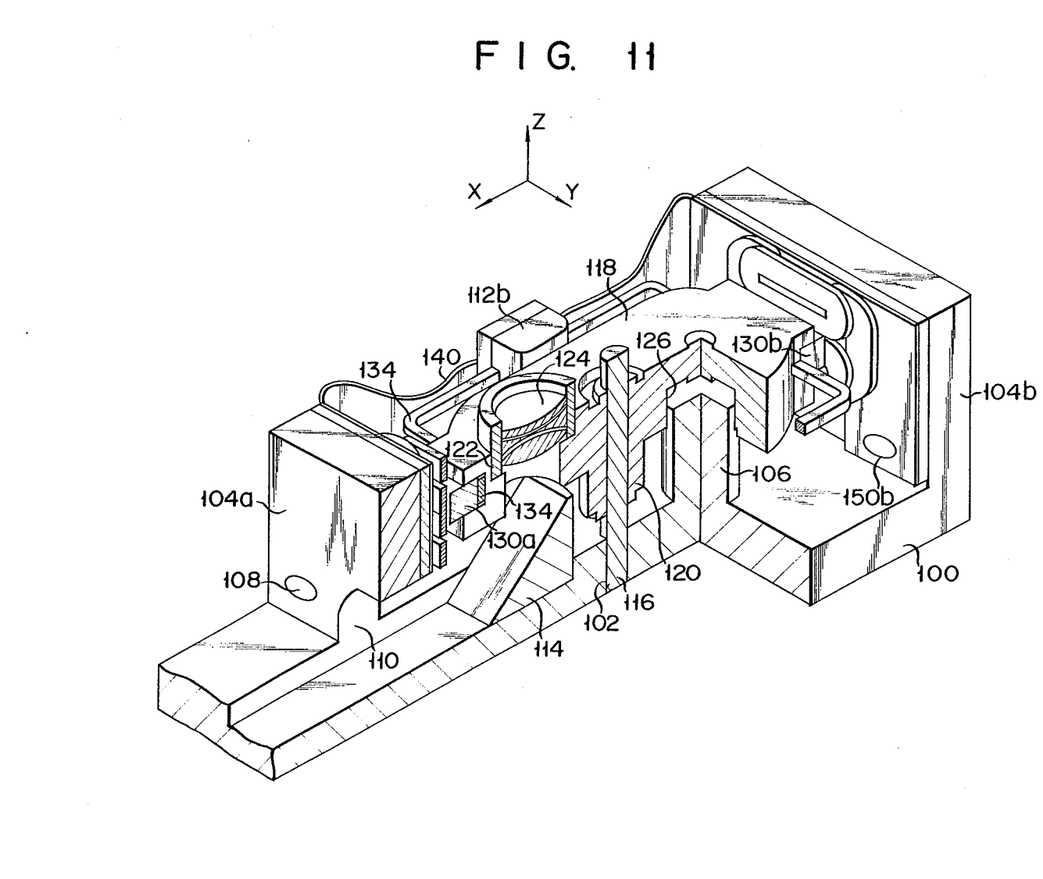
FIG. 11 is a perspective of the optical head partially cut away along line X'-X'' of FIG. 9.

With the above construction, movable body 118 is moved in direction Z of FIG. 11 by the electromagnetic force generated when current is supplied to focusing position adjustment coils 148a, 148b, to thereby effect the focusing control. Movable body 118 is rotated in direction Y of FIG. 11 by the electromagnetic force generated when current is supplied to tracking position adjustment coils 146a, 146b, to thereby effect the tracking control.

This apparatus has the following advantages.

The surfaces of magnets 130a, 130b, which face focusing coils 148a, 148b, are rectangular in shape so, by changing the side/length ratio, it is possible to distribute the desired driving force in the two intersecting directions. This means that a highly efficient driving system can be designed and power consumption can be decreased. For example, with a compact disk (CD) apparatus, a larger driving force is required for the focusing direction than for the tracking direction. Consequently, in this invention it is possible to increase the driving force in the focusing direction by causing the long sides of magnets 130a, 130b to face the long sides of the focusing coils 148a, 148b that are nearest to magnets 130a, 130b in the 2-layer position adjustment coils.

Figure 12:
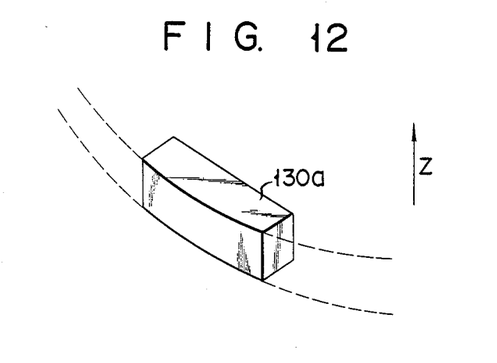
FIG. 12 is a perspective showing the shape of the magnets incorporated in the optical head apparatus of FIG. 9.
Figure 13:
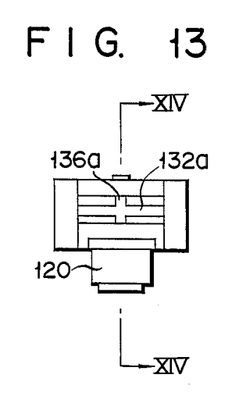
FIG. 13 is a side view of the movable body incorporated in the optical head apparatus of FIG. 9.
Figure 14:
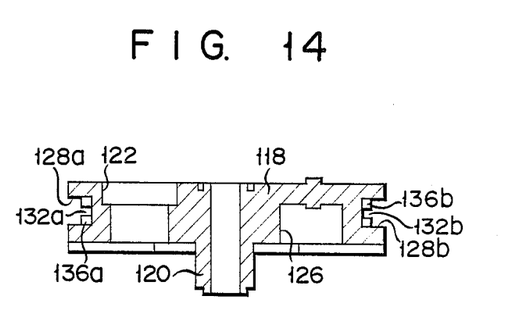
FIG. 14 is a cross section along the line XIV—XIV of FIG. 9.

As shown in FIGS. 9 and 12, the surfaces of magnets 130a, 130b facing focusing coils 148a, 148b are convex. If shown as radius R in FIG. 9, the radius would in reality be 10–30 mm. If the surface is not curved in this way, the left and right edges of magnets 130a, 130b will strike focusing coils 148a, 148b, which are arranged with very small gaps, when movable body 118 to which the magnets are attached are rotated for tracking control, making it impossible to position magnets 130a, 130b close to focusing coils 148a, 148b or tracking coils 146a, 146b. However, in order to improve driving sensitivity, the closer the magnets are positioned to the coils the better. In practice, the gap between magnets 130a, 130b and focusing coils 148a, 148b is about 0.1 to 0.3 mm. Accordingly, by making the surfaces of magnets 130a, 130b facing focusing coils 148a, 148b convex, it is possible to decrease the size of the gap between magnets 130a, 130b and focusing coils 148a, 148b, making it possible to effectively utilize the strongest portion of the magnetic field in the magnetic space generated by magnets 130a, 130b, thereby improving the drive sensitivity.

According to this invention, magnet positioning grooves 128a, 128b are provided in the side surfaces of movable body 118 and damper grooves 132a, 132b are provided at the bottom of magnet positioning grooves 128a, 128b. Damper member 134 is fitted into damper grooves 132a, 132b and the magnets are bonded into magnet positioning grooves 128a, 128b above them. Accordingly, it is possible to reliably attach damper member 134 to movable member 118 without bonding. Also, movable body 118 is made lighter and power consumption is reduced.

Movable body 118 and bushing 120 are formed as one unit of a resin material having high rigidity, such as a polyimide or polyphenylen sulfide, so the production cost is low. Compared to when the bearing is made of a metal such as aluminum, the sliding characteristics of the bearing is increased according to a lubricating action of the resin material, so that application of lubricants such as a solid lubricant is unnecessary. There is also no degradation of the sliding characteristic due to separation of the lubricant from the surface and there is no fluctuation in the sliding characteristics due to differences in the lubrication coating at the time of manufacture.

Position adjustment coils 146a, 146b, 148a, 148b are formed of flat conduction wires which have a rectangular cross section. The long side of the cross section is in the direction of magnetization of magnets 130a, 130b, shown by X axis. This results in an increase in the space utilizable in direction X, improving the utilization efficiency of the magnetic field space generated by magnets 130a and 130b and increasing the drive sensitivity.

Position adjustment coils 146a, 146b, 148a, 148b are substantially oval in shape and the long sides 146ax, 146bx, 148ax, 148bx face magnets 130a, 130b. The other long sides 146ay, 146by, 148ay, 148by do not face magnets 130a, 130b. Therefore, the magnetic flux direction of portions 146ax, 146bx, 148ax, 148bx of the position adjustment coils facing magnets 130a, 130b and the magnetic flux direction of portions 146ay, 146by, 148ay, 148by of the position adjustment coils not facing magnets 130a, 130b are in opposite directions. The direction of current is opposite for the parts facing and the parts not facing magnets 130a, 130b. Consequently, the direction of force is the same for the parts facing and the parts not facing magnets 130a, 130b, resulting in a more effective force from position adjustment coils 146a, 146b, 148a, 148b and a reduction in power consumption.

The lengthwise directions of position adjustment coils 146a, 148a or 146b, 148b are perpendicular to each other and are stacked into two layers, so one or the other of magnets 130a, 130b can apply an independent force toward two intersecting directions. Therefore, movable body 118 is lighter and more compact.

Each layer of position adjustment coil 146a, 146b, 148a, 148b is constructed of coils 146aI and 146aII, 146bI and 146bII, 148aI and 148aII, 148bI and 148bII being serially connected into pairs. The coils being substantially rectangular or oval in shape together with the above-mentioned construction of the coils 146a, 146b, 148a, 148b mean that coils 146a, 146b, 148a, 148b can be arranged, in the symmetrical positional relationship in regards to magnets 130a, 130b, such that the current in the portion with opposing magnetic flux flows in the opposite direction. Thus, when movable body 118 is moved in focusing direction Z or tracking direction Y, fluctuations in drive sensitivity do not depend on the direction of movement of movable body 118, resulting in a stable servo system.

The lengthwise direction of focusing position adjustment coils 148a, 148b intersects optical axis of objective lens 124 and the coils are positioned nearer to the magnets than tracking position adjustment coils 146a, 146b. Position adjustment coils 148a, 148b which provide a force in the focusing direction, are arranged in a stronger field of the magnetic field space generated by magnets 130a, 130b than the field in which tracking position adjustment coils 146a, 146b are arranged. Accordingly, the force in the focusing direction must be stronger than the force in the tracking direction, resulting in an efficient well balanced optical head apparatus, which in turn makes it possible to reduce the power consumption.

Position adjustment coils 146a, 146b, 148a, 148bb are fastened to the top of non-conductive printed circuit board 144. Therefore, no induced electromotive force is generated, even if an alternating current is supplied. Futhermore, even in the high frequency region, it is possible to reduce the phase delay between the impressed voltage of the coil and the force acting on movable body 118, which is generated when position adjustment coils are directly fastened to a conductor such as aluminum, resulting in stable control.

Coil positioning holes 150a, 150b are provided in flexible printed circuit board 144 so that it is easy to fasten coil unit 140 to the board accurately, thereby improving its mass productivity.

Figure 18A:
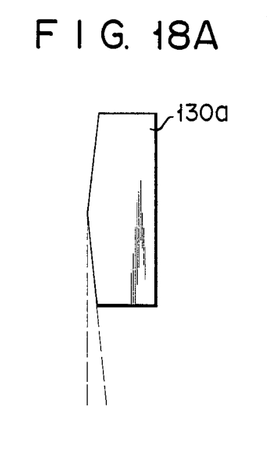
FIGS. 18A and 18B are plan views of another embodiment of the magnets incorporated in the optical head apparatus of this invention.
Figures 18B, 21:
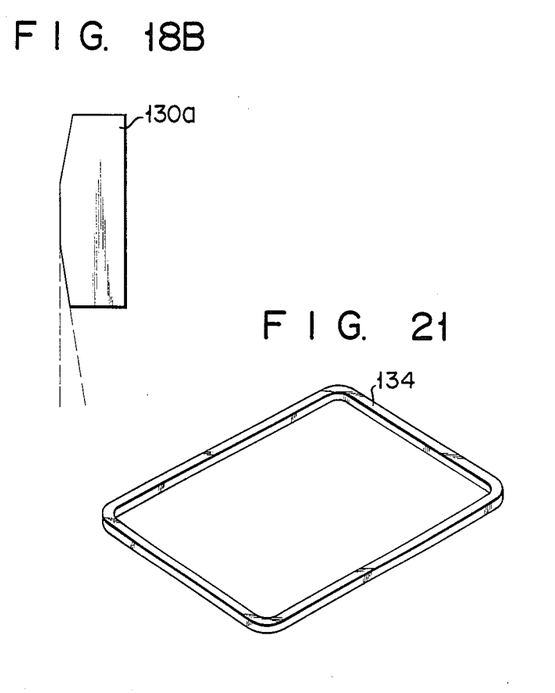
FIG. 21 is a perspective of the damper member incorporated in the movable body of FIG. 19.

According to this invention, the shape of magnets 130a, 130b is not limited to that described in the above embodiments. For example, as shown in FIGS. 18A and 18B, the side of magnet 130a, in its plan view, facing focusing coil 148a may be triangular or trapezoidal. In fact any shape is possible provided movable body 118 does not strike focusing coil 148a.

Figure 19:
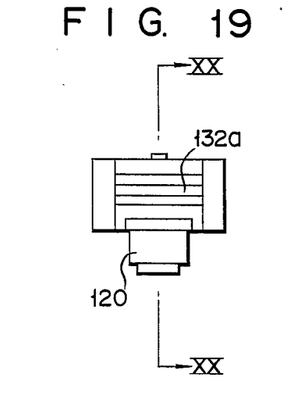
FIG. 19 is a side view of another embodiment of the movable body incorporated in the optical head apparatus of this invention.
Figure 20:
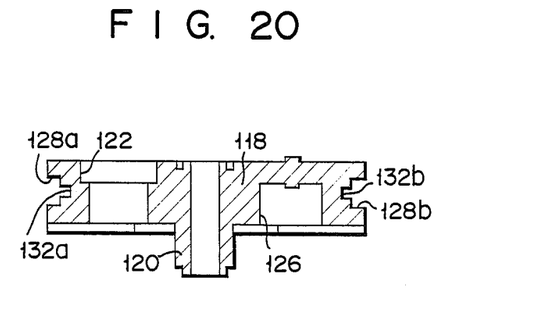
FIG. 20 is a cross section along the line XX—XX of FIG. 19.
Figure 22:
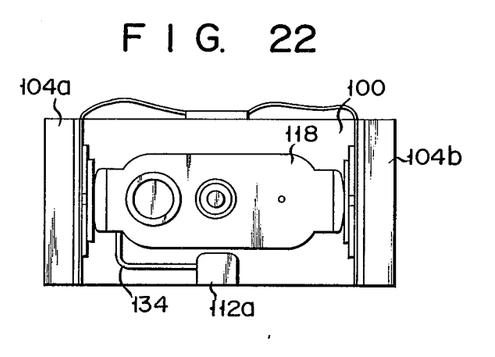
FIGS. 22 to 25 are plan views of another embodiment of the optical head apparatus of this invention, showing different positions of attachment of the damper member.
Figure 23:
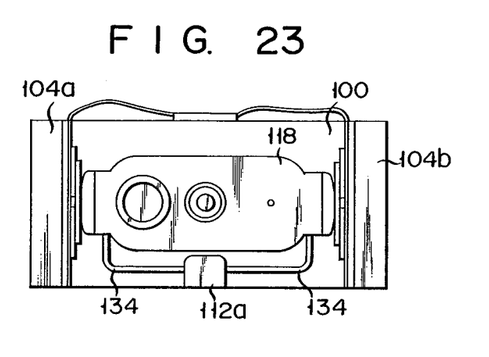
Figure 24:
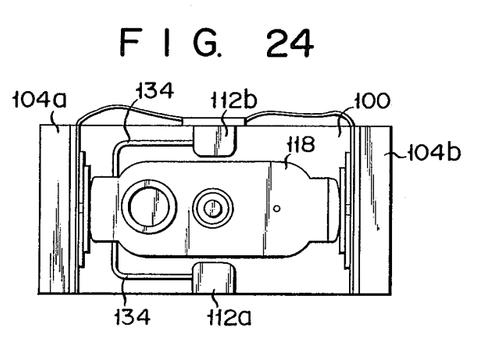
Figure 25:
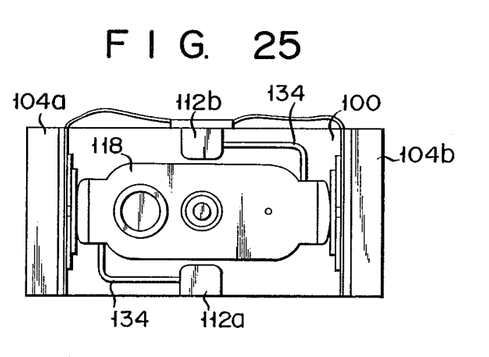

As shown in FIGS. 19 and 20, damper grooves 132a, 132b may have a uniform width. Accordingly, the damper may have a uniform width as shown in FIG. 21. Damper grooves 132a, 132b may have a portion which is deeper than the rest. Accordingly, the damper may have a portion that is thicker than the rest.

It is also possible to provide damper grooves 132a, 132b directly in the side surface of movable body 118 instead of providing magnet positioning grooves 128a, 128b in the side surface of movable body 118. In this case magnets 130a and 130b are directly bonded to the side surface of movable body 118 after damper member 134 has been fitted into grooves 132a, 132b.

Damper member 134 is able to carry out its function with only a portion of the member or with a combination of portions of the damper member as shown in FIGS. 22 to 25. This allows the weight and power consumption to be further reduced, thereby improving the drive sensitivity.

With the embodiment described above, it is not always necessary that the shape of the movable body be symmetrical with regard to the center. What is necessary is that the center of gravity of the movable body be in the center of the bearing. The shaft may be arranged on the movable body side and the bearing on the base side.

With the invention as described above, it is possible to improve the sensitivity of the tracking and focusing control of the optical head.

Since the surface of the magnet facing the coil is convex, it is also possible to reduce the size of the gap between the magnet and the coil and to effectively utilize the magnetic field space generated by the magnets. Accordingly, it is possible to provide an optical head apparatus that has high drive sensitivity with low power consumption.

The damper member engages with the damper groove provided in the movable member and the magnet is fastened over top by bonding. Accordingly, the attachment of the damper to the movable body is simplified and reliable. Also, the movable body is reduced in weight so power consumption can be reduced.

What is claimed is:

1. An optical head apparatus for recording and reproducing data by forming optical dots on a recording surfae of a recording medium, comprising:
a base, which is movable in a prescribed direction;
a movable body movably provided in relation to said base;
a lens, which is attached to said movable body;
a pair of magnets fixed to the side surfaces of said movable body; and
a pair of position adjustment coils, which are attached to said base facing said pair of magnets, for operating together with said magnets to move said movable body in a prescribed direction, said coils being wound such that planes including respective loops of the coils are perpendicular to direction of magnetization of said magnets, wherein the part area of said position adjustment coil facing said magnet is not more than half of the total area of both said coils and openings surrounded by said coils, and wherein when currents flow through said coils, forces act in the same direction on pairs of side portions of respective of said coils.

2. An optical head apparatus according to claim 1, further comprising support shaft means, which is implanted in said base, and has a bearing, for allowing said movable body to slide in said bearing.

3. An optical head apparatus according to claim 2, wherein the surface of said magnet facing said position adjustment coil is convex for preventing contact with said coil.

4. An optical head apparatus according to claim 2, further comprising a damper member attached to said base at at least one location, and attached to said movable body at at least one other location, a first groove provided in the side surface of said movable body for attaching said magnet and a second groove provided at the bottom of said first groove for engaging said damper member.

5. An optical head apparatus according to claim 4, wherein said damper member has a portion of differing width and said second groove has a portion of differing width.

6. An optical head apparatus according to claim 4, wherein said damper member has a portion of differing thickness and said second groove has a portion of differing thickness.

7. An optical head apparatus according to claim 1, wherein said pair of position adjustment coils are fastened on a flexible printed circuit board.

8. An optical head apparatus according to claim 7, wherein hole means are provided in said printed circuit board for attaching said coil in a prescribed position on said printed circuit board.

* * * * *